(12) United States Patent  (10) Patent No.: US 9,398,746 B1
Schweitzer  (45) Date of Patent: Jul. 26, 2016

(54) PROTECTION DEVICE THAT SEGREGATES BURROWING ANIMALS FROM PLANTS

(71) Applicant: Daniel Scott Schweitzer, Plumas Lake, CA (US)

(72) Inventor: Daniel Scott Schweitzer, Plumas Lake, CA (US)

(*) Notice: Subject to any disclaimer, the term of this patent is extended or adjusted under 35 U.S.C. 154(b) by 290 days.

(21) Appl. No.: 13/760,469

(22) Filed: Feb. 6, 2013

Related U.S. Application Data

(60) Provisional application No. 61/596,095, filed on Feb. 7, 2012.

(51) Int. Cl.
 *A01G 13/02* (2006.01)
 *A01G 13/10* (2006.01)

(52) U.S. Cl.
 CPC .................................. *A01G 13/10* (2013.01)

(58) Field of Classification Search
 CPC .... A01G 23/04; A01G 13/10; A01G 13/0237
 USPC .......... 47/32.7, 32, 32.3, 32.8, 73, 74, 75, 76, 47/77, 78
 See application file for complete search history.

(56) References Cited

U.S. PATENT DOCUMENTS

| | | | | |
|---|---|---|---|---|
| 1,994,553 A * | 3/1935 | Wolcott | | 47/74 |
| 2,252,073 A * | 8/1941 | Gray | | 47/78 |
| 2,960,798 A * | 11/1960 | Lindstaedt et al. | | 47/73 |
| 3,469,341 A * | 9/1969 | Bourget et al. | | 47/74 |
| 4,109,442 A * | 8/1978 | Maasbach | | 53/452 |
| 4,369,599 A * | 1/1983 | Franclet et al. | | 47/74 |
| 4,884,367 A * | 12/1989 | Lawton | | 47/78 |
| 5,495,692 A * | 3/1996 | LoJacono, Jr. | | 47/78 |
| 6,067,752 A * | 5/2000 | Bryan et al. | | 47/73 |
| 6,202,348 B1 * | 3/2001 | Reiger | | 47/78 |
| 6,612,072 B2 * | 9/2003 | Busby et al. | | 47/65.8 |
| 6,637,155 B1 * | 10/2003 | Butler et al. | | 47/73 |
| 2006/0150477 A1 * | 7/2006 | Mayer | | 47/32 |

* cited by examiner

*Primary Examiner* — Trinh Nguyen
(74) *Attorney, Agent, or Firm* — Plager Schack LLP

(57) ABSTRACT

A protection device segregates burrowing animals from plants. The protection device comprises a thread knitted into a boundary layer that is sealed with a staple. A user can insert a plant in a root ball earth into the protection device and insert the protection device into a hole in earth. The thread is flexible and does not release iron into the earth. The boundary layer prevents a burrowing animal from entering into the root ball earth and consuming roots of the plant. In some embodiments, the thread is a tubular non-woven stainless steel thread which is knitted in order to prevent existence of a seam. The thread allows the roots of the plant to grow out of the protection device allowing the plant to continue to grow, notwithstanding the boundary layer created by the thread.

3 Claims, 3 Drawing Sheets

PROTECTION DEVICE THAT SEGREGATES BURROWING ANIMALS FROM PLANTS

CROSS REFERENCE TO RELATED APPLICATIONS

This application claims priority to U.S. Provisional Patent Application 61/596,095, entitled "Sub terrain metal mesh rodent barrier", filed on Feb. 7, 2012. U.S. Provisional Patent Application 61/596,095 is incorporated herein by reference.

FIELD OF THE INVENTION

Embodiments of the disclosed invention relate to devices that segregate plants from vermin that may be destructive to the plants.

BACKGROUND OF THE INVENTION

To date, devices that protect plants from vermin are difficult to handle, require substantial maintenance and require at least a second piece to protect the stems of the plants. Embodiments of the present invention solve these problems.

BRIEF SUMMARY OF THE INVENTION

A protection device segregates burrowing animals from plants. The protection device comprises a thread knitted into a boundary layer that is sealed with a staple. A user can insert a plant in a root ball earth into the protection device and insert the protection device into a hole in earth. The thread is flexible and does not release iron into the earth. The boundary layer prevents a burrowing animal from entering into the root ball earth and consuming roots of the plant. In some embodiments, the thread is a tubular non-woven stainless steel thread which is knitted in order to prevent existence of a seam. The thread allows the roots of the plant to grow out of the protection device allowing the plant to continue to grow, notwithstanding the boundary layer created by the thread.

A method for protecting a plant from a burrowing animal comprises first knitting a thread into a boundary layer and stapling the boundary layer, creating a protection device. A user inserts the plant in a root ball earth into the protection device. The user then digs a hole in earth. After this the user inserts the protection device into the hole. The user next segregates the root ball earth from the earth with the boundary layer. The boundary layer prevents the burrowing animal from entering the root ball earth from the earth. This prevents the burrowing animal from eating roots of the plant.

BRIEF DESCRIPTION OF THE SEVERAL VIEWS OF THE DRAWINGS

Figures 1, 2:
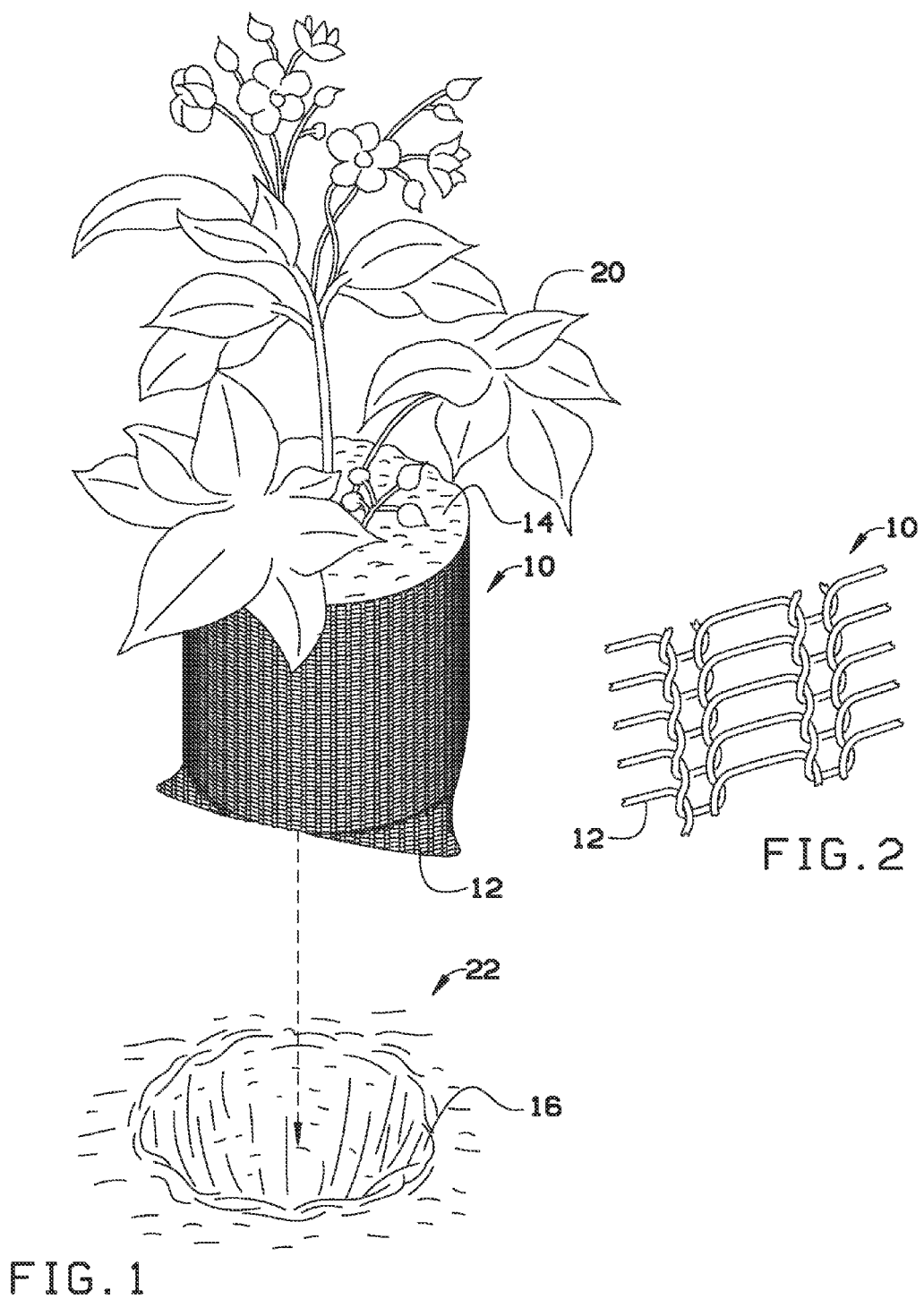

Having thus described the invention in general terms, reference will now be made to the accompanying drawings, which are not necessarily drawn to scale, and wherein:

FIG. 1 conceptually illustrates an embodiment of the invention while in use.

FIG. 2 is a detail perspective view of an embodiment of the invention illustrating weave pattern.

Figure 3:
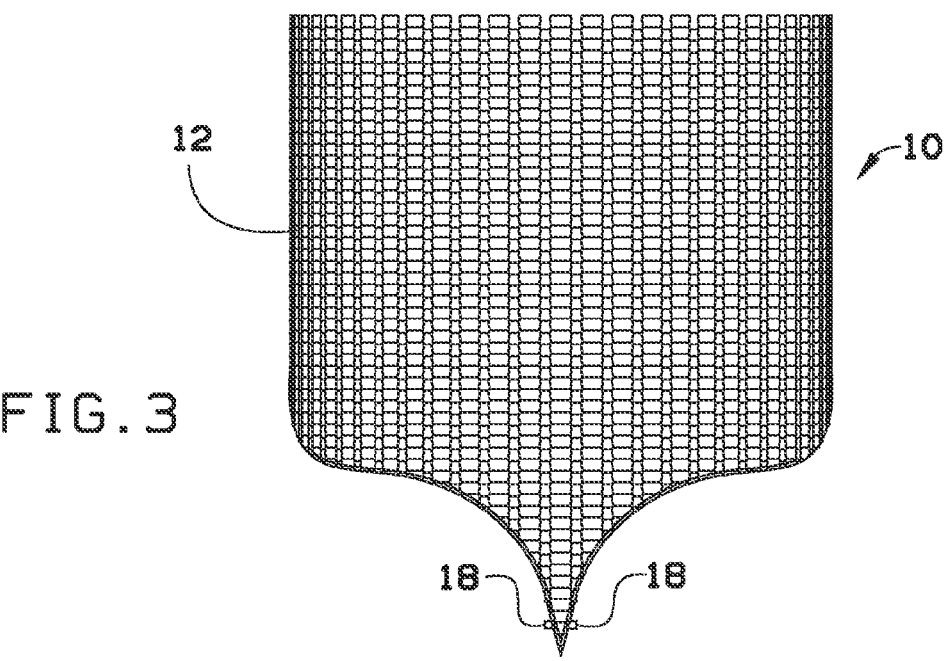

FIG. 3 is a side view of an embodiment of the invention.

Figure 4:
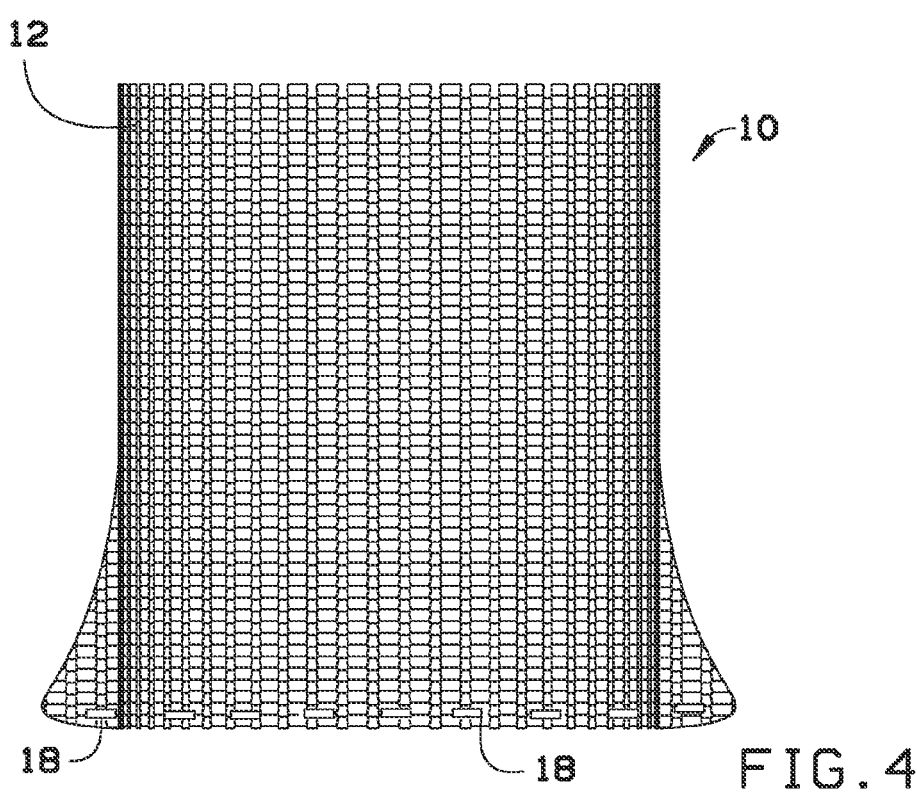

FIG. 4 is a front view of an embodiment of the invention.

Figure 5:
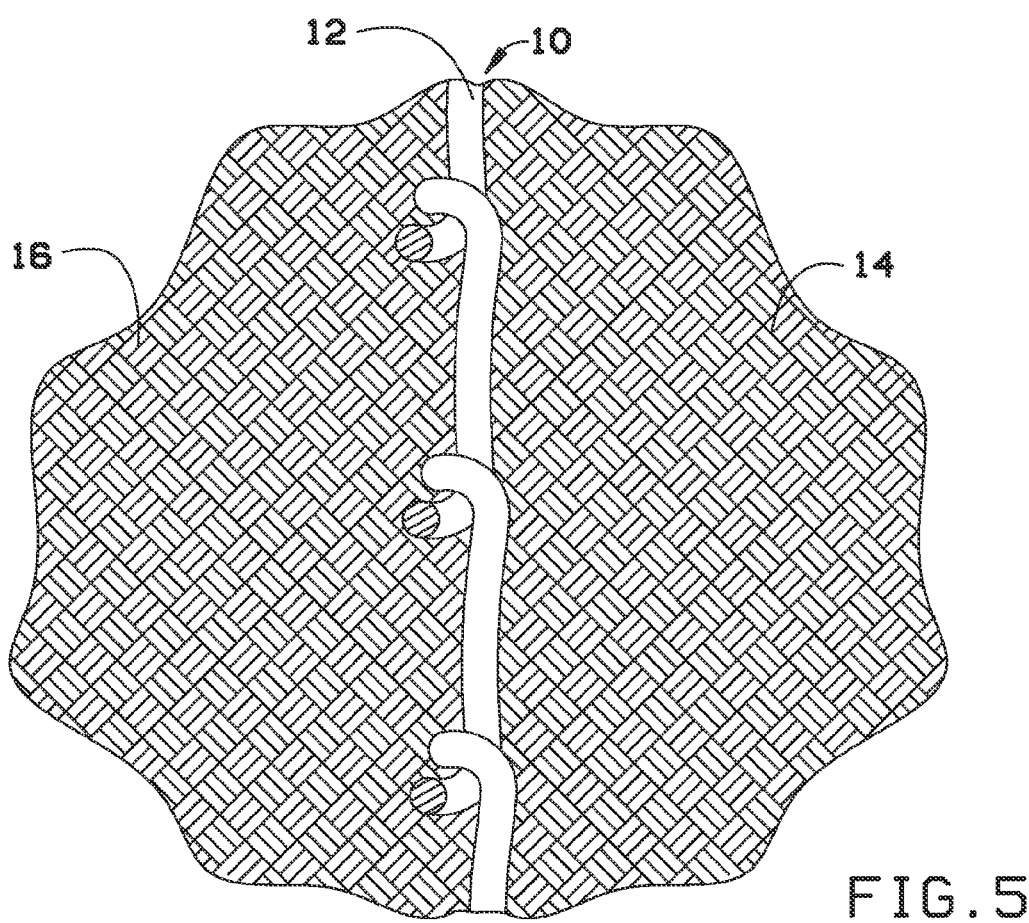

FIG. 5 is a side-section view of an embodiment of the invention shown ground installed.

DETAILED DESCRIPTION OF THE INVENTION

Embodiments of the present invention overcome many of the obstacles associated with segregating burrowing animals from plants, and now will be described more fully hereinafter with reference to the accompanying drawings that show some, but not all embodiments of the claimed inventions. Indeed, the invention may be embodied in many different forms and should not be construed as limited to the embodiments set forth herein. Rather, these embodiments are provided so that this disclosure will satisfy applicable legal requirements. Like numbers refer to like elements throughout.

FIG. 1 shows the invention in use. A user desires to segregate plant 20 from a burrowing animal (not shown). The user can do this with protection device 10. Protection device 10 is made from thread 12 as shown in FIG. 2 and staples 18 as shown in FIG. 3 and FIG. 4.

FIG. 1 and FIG. 5 show the device in use. First, a user staples the bottom of protection device 10 to keep the burrowing animal from entering protection device 10. Next, the user inserts plant 20 in root ball earth 14 into protection device 10. The user then digs earth 16 in hole 22. After that the user inserts protection device 10 into earth 16. This segregates earth 16 from root ball earth 14 creating a boundary layer. The boundary layer prevents the burrowing animal in hole 22 from crossing protection device 10 into root ball earth 14 and consuming roots of plant 20.

In FIG. 2, in a preferred embodiment of the invention, thread 12 is a tubular non-woven stainless steel thread which is knitted in order to prevent the existence of a seam. Rather there is a plurality of warp threads crossing a plurality of waft threads. Due to this construction, a user can utilize a thinner more malleable thread which allows the roots of plant 20 to grow out of protection device 10 allowing plant 20 to continue to grow, notwithstanding the barrier created by threads 12.

When comparing embodiments of the present invention with the prior art, chicken wire is hard and not malleable. Galvanized steel wire releases iron into the soil and cannot be used for organic farming. Rigid steel wire creates air pockets that are bad for planting. Further, embodiments of the present invention provide additional geometric flexibility that provide for user friendly installation as shown in FIG. 3 and FIG. 4.

FIG. 3 and FIG. 4 show two embodiments of the invention utilizing different arrangements of staple 18 for additional geometric flexibility. Turning to FIG. 3, protection device 10 is unrolled and arranged in a teardrop shape that can accommodate a deep rooted plant such as a rose, then stapled with staple 18. Turning to FIG. 4, protection device 10 is unrolled then arranged in a tubular shape that can accommodate a shallow rooted flower such as a petunia, then stapled with many staples 18.

That which is claimed:

1. A protection device that segregates burrowing animals from plants, the protection device comprising:
    a thread knitted into a boundary layer that is sealed with a staple and configured to receive a root ball earth into the protection device; wherein the protection device is further configured to rest in earth; wherein the thread comprises a metal that does not release iron into the earth, the thread is a tubular non-woven stainless steel thread which is knitted in order to prevent existence of a seam; the thread further comprises a plurality of warp threads crossing a plurality of waft threads; the thread allows the roots of the plant to grow out of the protection device allowing the plant to continue to grow, notwithstanding the boundary layer created by the thread;
    wherein the boundary layer is configured to prevent a burrowing animal from entering into the root ball earth and consuming roots of the plant.

2. The protection device of claim 1,
the protection device is arranged in a teardrop shape that can accommodate a deep rooted plant such as a rose then stapled with the staple.

3. The protection device of claim 1,
the protection device is arranged in a tubular shape that can accommodate a shallow rooted flower such as a petunia then stapled with many staples.

\* \* \* \* \*